US008566379B2

(12) United States Patent  
Yang (10) Patent No.: US 8,566,379 B2
(45) Date of Patent: Oct. 22, 2013

(54) SYSTEMS AND METHODS FOR SELF TUNING TARGET ADAPTATION (75) Inventor: Shaohua Yang, San Jose, CA (US)

(73) Assignee: LSI Corporation, San Jose, CA (US)

(*) Notice: Subject to any disclaimer, the term of this patent is extended or adjusted under 35 U.S.C. 154(b) by 541 days.

(21) Appl. No.: 12/947,931

(22) Filed: Nov. 17, 2010

(65) Prior Publication Data

US 2012/0124119 A1     May 17, 2012

(51) Int. Cl.
*G06F 17/10* (2006.01)

(52) U.S. Cl.
USPC .......................................................... 708/323

(58) Field of Classification Search
USPC ................................................. 708/322, 323
See application file for complete search history.

(56) References Cited

U.S. PATENT DOCUMENTS

| | | |
|---|---|---|
| 5,278,703 A | 1/1994 | Rub |
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,523,903 A | 6/1996 | Hetzler |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,768,044 A | 6/1998 | Hetzler |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |

(Continued)

FOREIGN PATENT DOCUMENTS

| | | |
|---|---|---|
| EP | 0522578 | 1/1993 |
| EP | 0631277 | 12/1994 |

(Continued)

OTHER PUBLICATIONS

U.S. Appl. No. 11/461,026, filed Jul. 31, 2006, Tan, Weijun.

(Continued)

*Primary Examiner* — Chuong D Ngo
(74) *Attorney, Agent, or Firm* — Hamilton DeSanctis & Cha (57) ABSTRACT

Various embodiments of the present invention provide systems and methods for data processing. As an example, a data processing circuit is disclosed that includes an equalizer circuit, a noise predictive filter circuit, a data detector circuit, a data reconstruction circuit, and an adaptation circuit. The equalizer circuit is operable to receive a data input and to provide an equalized output based at least in part on an equalizer coefficient. The noise predictive filter circuit is operable to receive the equalized output and to provide a noise whitened output based at least in part on a noise predictive filter coefficient. The data detector circuit is operable to apply a data detection algorithm to the noise whitened output to yield a detected output. The data reconstruction circuit is operable to receive the detected output and to provide a reconstructed output corresponding to the equalized output based at least in part on a target polynomial. The adaptation circuit is operable to adaptively calculate the equalizer coefficient, the noise predictive filter coefficient and the target polynomial.

20 Claims, 4 Drawing Sheets

(56) References Cited

U.S. PATENT DOCUMENTS

| | | | |
|---|---|---|---|
| 6,005,897 | A | 12/1999 | McCallister et al. |
| 6,023,783 | A | 2/2000 | Divsalar et al. |
| 6,029,264 | A | 2/2000 | Kobayashi et al. |
| 6,041,432 | A | 3/2000 | Ikeda |
| 6,065,149 | A | 5/2000 | Yamanaka |
| 6,097,764 | A | 8/2000 | McCallister et al. |
| 6,145,110 | A | 11/2000 | Khayrallah |
| 6,216,249 | B1 | 4/2001 | Bliss et al. |
| 6,216,251 | B1 | 4/2001 | McGinn |
| 6,229,467 | B1 | 5/2001 | Eklund et al. |
| 6,266,795 | B1 | 7/2001 | Wei |
| 6,317,472 | B1 | 11/2001 | Choi et al. |
| 6,351,832 | B1 | 2/2002 | Wei |
| 6,377,610 | B1 | 4/2002 | Hagenauer et al. |
| 6,381,726 | B1 | 4/2002 | Weng |
| 6,438,717 | B1 | 8/2002 | Butler et al. |
| 6,473,878 | B1 | 10/2002 | Wei |
| 6,476,989 | B1 | 11/2002 | Chainer et al. |
| 6,625,775 | B1 | 9/2003 | Kim |
| 6,657,803 | B1 | 12/2003 | Ling et al. |
| 6,671,404 | B1 | 12/2003 | Katawani et al. |
| 6,748,034 | B2 | 6/2004 | Hattori et al. |
| 6,757,862 | B1 | 6/2004 | Marianetti |
| 6,785,863 | B2 | 8/2004 | Blankenship et al. |
| 6,788,654 | B1 | 9/2004 | Hashimoto et al. |
| 6,810,502 | B2 | 10/2004 | Eidson |
| 6,980,382 | B2 | 12/2005 | Hirano et al. |
| 6,986,098 | B2 | 1/2006 | Poeppelman |
| 7,010,051 | B2 | 3/2006 | Murayama et al. |
| 7,047,474 | B2 | 5/2006 | Rhee et al. |
| 7,058,873 | B2 | 6/2006 | Song et al. |
| 7,073,118 | B2 | 7/2006 | Greenberg et al. |
| 7,093,179 | B2 | 8/2006 | Shea |
| 7,113,356 | B1 | 9/2006 | Wu |
| 7,136,244 | B1 | 11/2006 | Rothbert |
| 7,173,783 | B1 | 2/2007 | McEwen et al. |
| 7,184,486 | B1 | 2/2007 | Wu et al. |
| 7,191,378 | B2 | 3/2007 | Eroz et al. |
| 7,203,015 | B2 | 4/2007 | Sakai et al. |
| 7,203,887 | B2 | 4/2007 | Eroz et al. |
| 7,236,757 | B2 | 6/2007 | Raghaven et al. |
| 7,257,764 | B2 | 8/2007 | Suzuki et al. |
| 7,298,570 | B1 * | 11/2007 | Han ................ 360/65 |
| 7,310,768 | B2 | 12/2007 | Eidson et al. |
| 7,313,750 | B1 | 12/2007 | Feng et al. |
| 7,370,258 | B2 | 5/2008 | Iancu et al. |
| 7,403,752 | B2 | 7/2008 | Raghavan et al. |
| 7,430,256 | B2 | 9/2008 | Zhidkov |
| 7,502,189 | B2 | 3/2009 | Sawaguchi et al. |
| 7,505,537 | B1 | 3/2009 | Sutardja |
| 7,511,910 | B1 * | 3/2009 | Han ................ 360/65 |
| 7,523,375 | B2 | 4/2009 | Spencer |
| 7,509,927 | B2 | 9/2009 | Shin et al. |
| 7,587,657 | B2 | 9/2009 | Haratsch |
| 7,590,168 | B2 | 9/2009 | Raghaven et al. |
| 7,702,989 | B2 | 4/2010 | Graef et al. |
| 7,712,008 | B2 | 5/2010 | Song et al. |
| 7,738,201 | B2 | 6/2010 | Jin et al. |
| 7,752,523 | B1 | 7/2010 | Chaichanavong |
| 7,801,200 | B2 | 9/2010 | Tan |
| 7,802,163 | B2 | 9/2010 | Tan |
| 7,982,985 | B1 * | 7/2011 | Chaichanavong ............... 360/26 |
| 8,416,520 | B1 * | 4/2013 | Song ................ 360/65 |
| 2003/0063405 | A1 | 4/2003 | Jin et al. |
| 2003/0081693 | A1 | 5/2003 | Raghaven et al. |
| 2003/0087634 | A1 | 5/2003 | Raghaven et al. |
| 2003/0112896 | A1 | 6/2003 | Raghaven et al. |
| 2003/0134607 | A1 | 7/2003 | Raghaven et al. |
| 2004/0071206 | A1 | 4/2004 | Takatsu |
| 2004/0098659 | A1 | 5/2004 | Bjerke et al. |
| 2005/0010855 | A1 | 1/2005 | Lusky |
| 2005/0078399 | A1 | 4/2005 | Fung |
| 2005/0111540 | A1 | 5/2005 | Modrie et al. |
| 2005/0157780 | A1 | 7/2005 | Werner et al. |
| 2005/0195749 | A1 | 9/2005 | Elmasry et al. |
| 2005/0216819 | A1 | 9/2005 | Chugg et al. |
| 2005/0273688 | A1 | 12/2005 | Argon |
| 2006/0020872 | A1 | 1/2006 | Richardson et al. |
| 2006/0031737 | A1 | 2/2006 | Chugg et al. |
| 2006/0123285 | A1 | 6/2006 | De Araujo et al. |
| 2006/0140311 | A1 | 6/2006 | Ashley et al. |
| 2006/0168493 | A1 | 7/2006 | Song et al. |
| 2006/0195772 | A1 | 8/2006 | Graef et al. |
| 2006/0210002 | A1 | 9/2006 | Yang et al. |
| 2006/0248435 | A1 | 11/2006 | Haratsch |
| 2006/0256670 | A1 | 11/2006 | Park |
| 2007/0011569 | A1 | 1/2007 | Vila Casado et al. |
| 2007/0047121 | A1 | 3/2007 | Elefeheriou et al. |
| 2007/0047635 | A1 | 3/2007 | Stojanovic et al. |
| 2007/0110200 | A1 | 5/2007 | Mergen et al. |
| 2007/0230407 | A1 | 10/2007 | Petrie et al. |
| 2007/0286270 | A1 | 12/2007 | Huang et al. |
| 2008/0049825 | A1 | 2/2008 | Chen et al. |
| 2008/0055122 | A1 | 3/2008 | Tan |
| 2008/0065970 | A1 | 3/2008 | Tan |
| 2008/0069373 | A1 | 3/2008 | Jiang et al. |
| 2008/0168330 | A1 | 7/2008 | Graef et al. |
| 2008/0276156 | A1 | 11/2008 | Gunnam |
| 2008/0301521 | A1 | 12/2008 | Gunnam |
| 2009/0185643 | A1 | 7/2009 | Fitzpatrick |
| 2009/0199071 | A1 | 8/2009 | Graef |
| 2009/0235116 | A1 | 9/2009 | Tan et al. |
| 2009/0235146 | A1 | 9/2009 | Tan |
| 2009/0259915 | A1 | 10/2009 | Livshitz et al. |
| 2009/0273492 | A1 | 11/2009 | Yang et al. |
| 2009/0274247 | A1 | 11/2009 | Galbraith et al. |
| 2010/0002795 | A1 | 1/2010 | Raghaven et al. |
| 2010/0042877 | A1 | 2/2010 | Tan |
| 2010/0042890 | A1 | 2/2010 | Gunam |
| 2010/0050043 | A1 | 2/2010 | Savin |
| 2010/0061492 | A1 | 3/2010 | Noelder |
| 2010/0070837 | A1 | 3/2010 | Xu et al. |
| 2010/0164764 | A1 | 7/2010 | Nayak |
| 2010/0185914 | A1 | 7/2010 | Tan et al. |
| 2011/0075569 | A1 | 3/2011 | Marrow et al. |
| 2011/0080211 | A1 | 4/2011 | Yang et al. |
| 2011/0167246 | A1 | 7/2011 | Yang et al. |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/101578 | 4/2009 |
| WO | WO 2010/126482 | 4/2010 |
| WO | WO 2010/101578 | 9/2010 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 13, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2010, Liu, et al.
U.S. Appl. No. 12/887,317, filed Sep. 2, 2010, Xia et al.
U.S. Appl. No. 12/887,330, filed Sep. 21, 2010, Zhang, et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/901,742, filed Oct. 11, 2010, Yang.
U.S. Appl. No. 12/917,756, filed Nov. 2, 2010, Miladinovic et al.
U.S. Appl. No. 12/947,931, filed Nov. 17, 2010, Yang, Shaohua.
U.S. Appl. No. 12/947,947, filed Nov. 17, 2010, Ivkovic et al.
U.S. Appl. No. 12/947,942, filed Dec. 20, 2010, Liao et al.
U.S. Appl. No. 12/992,948, filed Nov. 16, 2010, Yang et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.

(56) References Cited

OTHER PUBLICATIONS

Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System" Architectures: Synergies with Solid-State Disks Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al. A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center Ny, NY vol. 33, No. 2 Feb. 1995.

Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Unknown, "Auto threshold and Auto Local Threshold" [online] [retrieved May 28, 2010] Retrieved from the Internet: <URL:http://www.density.bham.ac.uk/landinig/software/autot.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irrreg. of Row-Weight Distrib. of the Parity-Chk. Matrix in Irreg. LDPC Codes for 10-Gb/s Opt. Signls" Jrnl of Lightwave Tech., vol. 23, Sep. 2005.
Zhong et al., "Area-Efficient Min-Sum Decoder VLSI Architecture for High-Rate QC-LDPC Codes in Magnetic Recording", pp. 1-15, Submitted 2006, not yet published.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Iterative MAX-LOG-MAP and LDPC Detector/Decoder Hardware Implementation for Magnetic Read Channel", SRC TECHRON, pp. 1-4, Oct. 2005.
Zhong et al., "Joint Code-Encoder Design for LPDC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "VLSI Architecture of LDPC Based Signal Detection and Coding System for Magnetic Recording Channel", Thesis, RPI, Troy, NY, pp. 1-95, May 2006.

* cited by examiner

SYSTEMS AND METHODS FOR SELF TUNING TARGET ADAPTATION

BACKGROUND OF THE INVENTION

The present inventions are related to systems and methods for data processing, and more particularly to systems and methods for adaptive data processing.

Various circuits have been developed that provide for identifying synchronization marks within a data stream. As an example, a synchronization mark is identified based upon a threshold comparison. Such a threshold comparison approach depends highly upon determining an appropriate threshold for comparison. Where the selected threshold is too high, sync marks will be missed. Alternatively, where the selected threshold is too low, sync marks may be incorrectly identified. Either case is problematic for proper data processing.

Hence, for at least the aforementioned reasons, there exists a need in the art for advanced systems and methods for sync mark identification.

BRIEF SUMMARY OF THE INVENTION

The present inventions are related to systems and methods for data processing, and more particularly to systems and methods for adaptive data processing.

Various embodiments of the present inventions provide methods for data processing that include: receiving a data input; equalizing the data input based on an equalizer coefficient to yield an equalized output; performing a data detection on a derivative of the equalized output to yield a detected output; reconstructing the detected output based on a target polynomial to yield a reconstructed output; aligning the equalized output with the reconstructed output to yield a delayed output; calculating a difference between the reconstructed output and the delayed output to yield an error value; filtering the error value based at least in part on a filter coefficient to yield a filtered output; and using the filtered output to adapt the filter coefficient, the target polynomial, and the equalizer coefficient.

In some instances of the aforementioned embodiments, the data input is received from an analog to digital converter circuit, and the method further includes receiving an analog input, and converting the analog input signal into a digital output, wherein the digital output is the data input. In various instances of the aforementioned embodiments, the data input is derived from a storage medium or a transfer medium.

In some instances of the aforementioned embodiments, the data input is initially a known data input, and subsequently an unknown data input. In such instances, during processing the unknown data input the target polynomial may be fixed to a value adaptively determined during processing the known data input. In one or more instances of the aforementioned embodiments, using the filter output to adapt the target polynomial is done by minimizing a noise whitened and squared version of the error value, and using the filter output to adapt the equalizer coefficient is done by minimizing a noise whitened and squared version of the error value.

Other embodiments of the present invention provide data processing circuits. Such data processing circuits include: an equalizer circuit, a noise predictive filter circuit, a data detector circuit, a data reconstruction circuit, and an adaptation circuit. The equalizer circuit is operable to receive a data input and to provide an equalized output based at least in part on an equalizer coefficient. The noise predictive filter circuit is operable to receive the equalized output and to provide a noise whitened output based at least in part on a noise predictive filter coefficient. The data detector circuit is operable to apply a data detection algorithm to the noise whitened output to yield a detected output. The data reconstruction circuit is operable to receive the detected output and to provide a reconstructed output corresponding to the equalized output based at least in part on a target polynomial. The adaptation circuit is operable to adaptively calculate the equalizer coefficient, the noise predictive filter coefficient and the target polynomial.

In some instances of the aforementioned embodiments, the adaptation circuit includes a summation circuit operable to subtract the reconstructed output from the equalized output to yield an error value. In particular cases, the adaptation circuit further includes an equalizer adaptation circuit operable to minimize the noise whitened and squared version of the error value, and a target adaptation circuit operable to minimize a noise whitened and squared version of the error value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for adaptive data processing.

Figure 1:
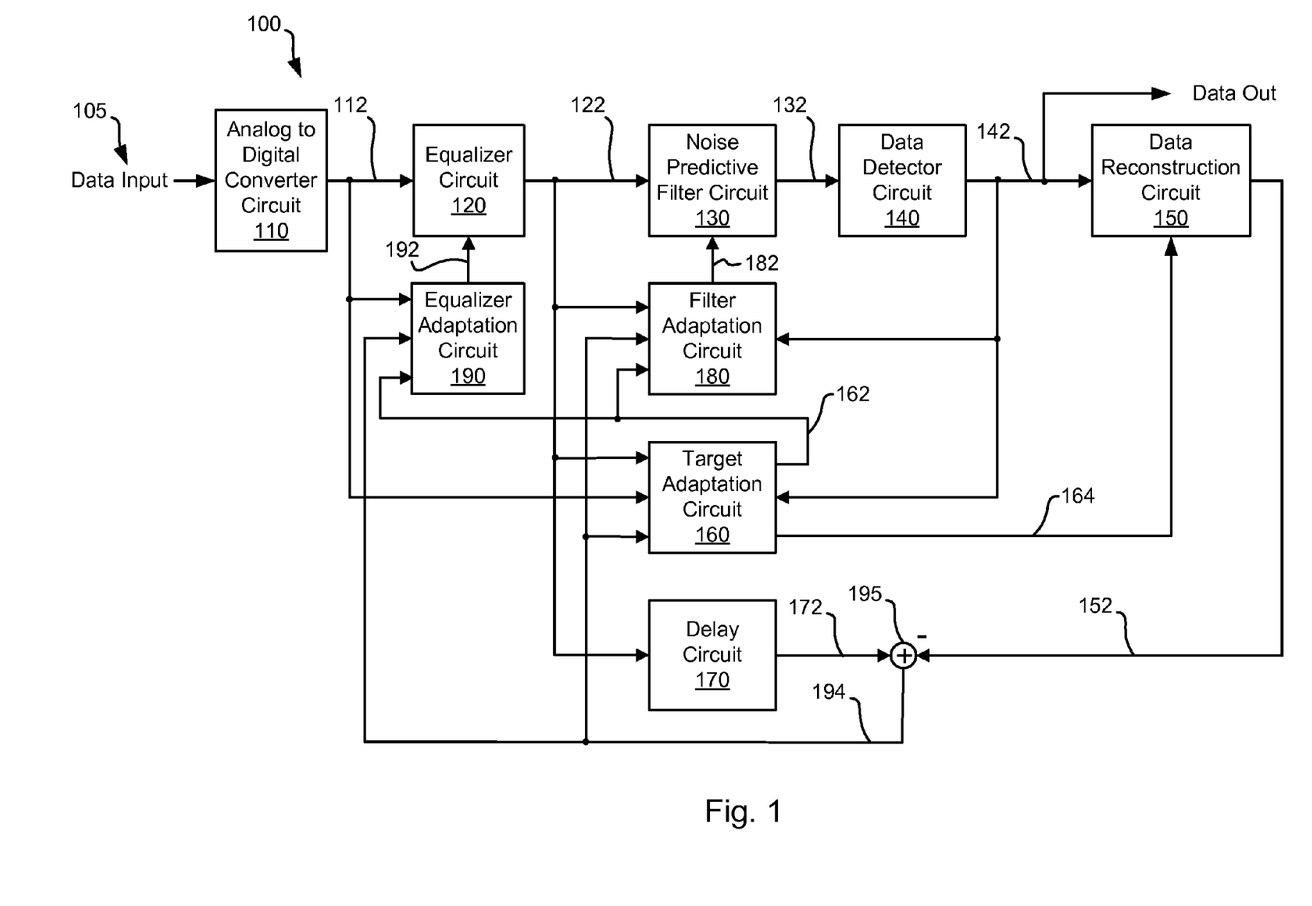
FIG. 1 depicts a data processing circuit including an adaptive feedback noise processing, equalization and targeting circuit in accordance with some embodiments of the present invention.

Turning to FIG. 1, a data processing circuit 100 including an adaptive feedback noise processing, equalization and targeting circuit is shown in accordance with some embodiments of the present invention. Data processing circuit 100 includes an analog to digital conversion circuit 110 that receives a data input 105. Data input 105 is an analog signal representing information that may be received from a variety of sources including, but not limited to, a storage medium or a data transfer medium in a communication device. Based upon the disclosure provided herein, one of ordinary skill in the art will recognize a variety of sources for data input 105. Analog to digital converter circuit 110 samples data input 105 and provides the samples as a series of digital values 112. Digital values 112 are generally referred to herein as y samples.

Digital values 112 are provided to an equalizer circuit 120 that performs a data equalization on the received values in accordance with equalizer coefficients 192 provided from an equalizer adaptation circuit 190 and provides an equalized output 122. Equalized output 122 is generally referred to herein as y samples, and may be described by the following equation:

$$y = ax,$$

where a corresponds to equalizer coefficients 192 collectively. In one particular embodiment of the present invention, a ten tap filter length is used to implement equalizer adaptation circuit 190. In such cases, equalizer coefficients ($a_j$) include ten values (j=0, 1, 2, 3 ... 9). Based upon the disclosure provided herein, one of ordinary skill in the art will recognize a variety of equalizer lengths and implementations that may be used in relation to different embodiments of the present invention.

Equalized output 122 to a noise predictive filter circuit 130 that performs noise predictive filtering in equalized output 122 in accordance with noise predictive coefficients 182 to yield a noise whitened output 132. Noise predictive filter circuit 130 may be any noise predictive filter circuit known in the art. In one particular embodiment of the present invention, noise predictive filter 130 has a three tap filter length that is used to implement noise predictive filter circuit 130. In such cases, noise predictive coefficients include four values (m=0, 1, 2, 3). Based upon the disclosure provided herein, one of ordinary skill in the art will recognize a variety of noise predictive filter lengths and implementations that may be used in relation to different embodiments of the present invention.

Noise whitened output 132 is provided to a data detector circuit 140 that performs a data detection on the received input to yield a data output 142. Data output 142 includes both hard decision data and soft decision data. The soft decision data indicates a likelihood that the corresponding hard decision data is correctly selected. The operation of data detector circuit 140 is governed by a target polynomial 164 (i.e., target coefficients) provided by a filter adaptation circuit 160. Data detector circuit may be any data detector circuit known in the art. In one particular embodiment of the present invention, data detector circuit 140 is a maximum a posteriori data detector circuit as is known in the art. The hard decision portion of data output 142 is provided to both filter adaptation circuit 180 and target adaptation circuit 160.

A data reconstruction circuit 150 operates on the hard decision portion of data output 142 to reconstruct a data set corresponding to equalized output 122 and provide a reconstructed output 152. Data reconstruction circuit 150 may be any circuit known in the art that is capable of regenerating an original input based on a received detected output. Reconstructed output 152 is generally referred to herein as ŷ samples. Reconstructed output 152 is provided to a summation circuit 195 where it is subtracted from a delayed equalized output 172 received from a delay circuit 170. In particular, delay circuit 172 receives equalized output 122 and delays it in time to align with the bit positions of reconstructed output 152 corresponding to equalized output 122. An error value 194 is provided from summation circuit 195 in accordance with the following equation:

$$\text{Error Value} = \sum_{j=0}^{z} a_j x[k-j] - \hat{y}[k].$$

where j indicates one of the equalizer coefficients. In one embodiment of the present invention, the equalizer circuit is a ten tap equalizer filter in which case the value of z is nine. Based upon the disclosure provided herein, one of ordinary skill in the art will recognize other equalizer circuits lengths that may be used in accordance with different embodiments of the present invention. Of note, the aforementioned is an ideal equation that may be modified to account for mis-equalization ($\mu[cond]$) that may be considered as part of the target adaptation process discussed below. The modified equation accounting for mis-equalization is as follows:

$$\text{Error Value} = \sum_{j=0}^{z} a_j x[k-j] - \mu[cond] - \hat{y}[k].$$

Error value 194 is provided to equalizer adaptation circuit 190, filter adaptation circuit 180 and target adaptation circuit 160.

Filter adaptation circuit 180 adaptively calculates noise predictive coefficients 182 using any adaptive calculation process known in the art. In particular, filter adaptation circuit 180 adaptively calculates noise predictive coefficients 182 based on error value 194, equalized output 122 and a target feedback value 162.

Equalization adaptation circuit 190 adaptively calculates equalizer coefficients 192 to minimize a noise whitened and squared version of the error value as set forth in the following equation:

$$\text{Squared Error} = (\text{ErrorTerm})^2,$$

where the ErrorTerm is defined by the following equation:

$$\text{Error Term} = \sum_{m=0}^{t} \left( \sum_{j=0}^{z} a_j x[k-m-j] - \mu[cond][m] - \hat{y}[k-m] \right) f[cond][m],$$

where m represents each filter tap on a noise predictive filter that performs the f[cond][m] processing. In one particular embodiment of the present invention, the noise predictive filter is a three tap filter length in which case t is equal to three. Minimizing noise whitened and squared version of the error value by changing the equalizer coefficients 192 ($a_n$) to drive the following gradient (i.e., $$\frac{\partial \eta}{\partial a_n})$$

of the Squared Error to zero for each coefficient:

$$\text{Gradient} = 2\left(\sum_{m=0}^{t}(e[k-m] - \mu[cond][m])f[cond][m]\right)\left(\sum_{m=0}^{t}(x[k-m-n])f[cond][m]\right),$$

where e[k−m] is short for the difference between the reconstructed output and the target error shown in the following equation:

$$e[k-m] = \sum_{j=0}^{z} a_j x[k-j] - \hat{y}[k].$$

Target adaptation circuit 160 adaptively calculates target polynomial 164 to minimize a noise whitened and squared version of the error value. Minimizing noise whitened and squared version of the error value by changing target polynomial 164 to drive the following gradient the following gradient of the squared error (i.e., $$\frac{\partial \eta}{\partial \mu[cond][m]})$$

is set equal to zero to determine an optimal value for the target which accounts for the mis-equalization term:

$$\text{Gradient} = 2\left(\sum_{m=0}^{t}(e[k-m] - \mu[cond][m])f[cond][m]\right)(-f[cond][m]).$$

Again, e[k−m] is short for the difference between the reconstructed output and the target error shown in the following equation:

$$e[k-m] = \sum_{j=0}^{z} a_j x[k-j] - \hat{y}[k].$$

In operation, data processing circuit 100 receives a known data set as data input 105 for processing. As the canned input is being processed, filter adaptation circuit 180 adaptively calculates noise predictive coefficients 182 using a standard adaptive calculation process known in the art. While processing the known data input, equalization adaptation circuit 190 adaptively calculates equalizer coefficients 192 to minimize a noise whitened and squared version of the error value, and target adaptation circuit 160 adaptively calculates target polynomial 164 to minimize a noise whitened and squared version of the error value. Once a minimum occurs, target polynomial is fixed and stored for use during regular data processing.

At this juncture a regular data input (i.e., an unknown data input) is provided as data input 105. Target polynomial 164, equalizer coefficients 192, and noise predictive coefficients 182 are initially applied. While processing the regular data input, filter adaptation circuit 180 adaptively calculates noise predictive coefficients 182 using a standard adaptive calculation process known in the art, and equalization adaptation circuit 190 adaptively calculates equalizer coefficients 192 to minimize a noise whitened and squared version of the error value.

Figure 2A:
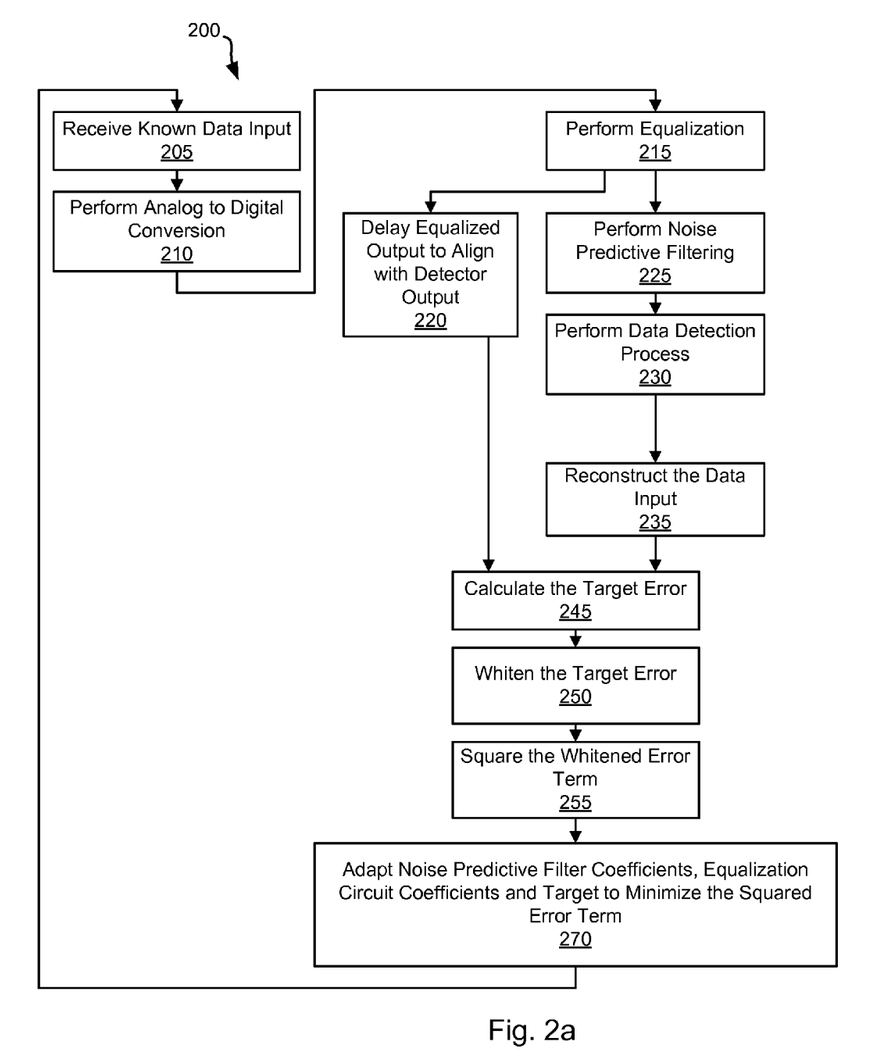
FIG. 2a is a flow diagram showing a process in accordance with some embodiments of the present invention for adaptively adjusting noise processing, equalization and targeting in a data processing circuit to establish a baseline.

Turning to FIG. 2a, a flow diagram 200 shows a process in accordance with some embodiments of the present invention for adaptively adjusting noise processing, equalization and targeting in a data processing circuit to establish a baseline. Following flow diagram 200, a known data input is received (block 205). The data input is a defined, known analog signal representing informational bits at various times or bit locations. Based upon the disclosure provided herein, one of ordinary skill in the art will recognize a variety of sources of the known data input.

An analog to digital conversion is applied to the data input to yield a series of digital samples corresponding to respective sample periods (block 210). The resulting digital samples are generally referred to herein as x samples. The analog to digital conversion may be applied using any analog to digital conversion approach known in the art. The resulting series of digital samples are provided to an equalization circuit where they are equalized to an equalization target (block 215). The equalizer circuit is initialized with coefficients that are expected to be close to the final adapted equalizer coefficients. The resulting digital samples are generally referred to herein as y samples, and may be described by the following equation:

y=ax, where a corresponds to the equalization target. The equalization may be done using any equalization process known in the art. For example, in one embodiment of the present invention, the equalization is done using a finite impulse response filter with operation governed by one or more filter taps as is known in the art. The resulting equalized data samples are provided to a noise predictive filter circuit that performs noise predictive filtering to yield a noise whitened output (block 225). The noise predictive filtering may be done using any noise predictive filtering circuit governed based on one or more filter taps as is known in the art.

The noise whitened output is provided to a data detector circuit where a data detection algorithm is applied to the received sample in an effort to recover the originally written data (block 230). This data detection process may be any data detection process known in the art. For example, the data detection process may be a maximum a posteriori data detection process as is known in the art.

In addition, the resulting detected output is used to reconstruct the data input for comparison purposes (block 235). The resulting reconstructed output is generally referred to herein as ŷ samples. The equalized output (block 215) is delayed in time to align it with the corresponding reconstructed data (block 220). The delayed equalized output and the reconstructed output are combined to calculate a target error (block 245) in accordance with the following equation:

$$\text{Error} = \sum_{j=0}^{z} a_j x[k-j] - \hat{y}[k],$$

where j indicates one of the equalizer coefficients. In one embodiment of the present invention, the equalizer circuit is a ten tap equalizer filter in which case the value of z is nine. Based upon the disclosure provided herein, one of ordinary skill in the art will recognize other equalizer circuits lengths that may be used in accordance with different embodiments of the present invention. Of note, the aforementioned is an ideal equation that may be modified to account for mis-equalization (μ[cond]) that may be considered as part of the target adaptation process discussed below. The modified equation accounting for mis-equalization is as follows:

$$\text{Error} = \sum_{j=0}^{z} a_j x[k-j] - \mu[cond] - \hat{y}[k].$$

The determined error is then noise whitened to yield a whitened error term (block 250) in accordance with the following equation:

Error Term =

$$\sum_{m=0}^{t} \left( \sum_{j=0}^{z} a_j x[k-m-j] - \mu[cond][m] - \hat{y}[k-m] \right) f[cond][m],$$

where m represents each filter tap on a noise predictive filter that performs the f[cond][m] processing. In one particular embodiment of the present invention, the noise predictive filter is a three tap filter length in which case t is equal to two. The error term is then squared (block 255) in accordance with the following equation:

Squared Error=(ErrorTerm)².

The existing noise predictive filter coefficients, equalization coefficients and target coefficients are modified to adaptively minimize the squared error term (block 270). The resulting adapted values are used in processing a newly received data input. The adapted values are calculated using any approach known in the art for optimizing noise predictive coefficients (i.e., f[cond][m]). Using the aforementioned f[cond][m], the following gradient of the squared error (i.e., $$\frac{\partial \eta}{\partial a_n} )$$

is set equal to zero to determine an optimal value for the equalizer coefficients ($a_n$) for each coefficient:

$$\text{Gradient} = 2 \left( \sum_{m=0}^{t} (e[k-m] - \mu[cond][m]) f[cond][m] \right)$$

$$\left( \sum_{m=0}^{t} (x[k-m-n]) f[cond][m] \right),$$

where e[k−m] is short for the difference between the reconstructed output and the target error shown in the following equation:

$$e[k-m] = \sum_{j=0}^{z} a_j x[k-j] - \hat{y}[k].$$

Similarly, using the aforementioned f[cond][m], the following gradient of the squared error (i.e., $$\frac{\partial \eta}{\partial \mu[cond][m]} )$$

is set equal to zero to determine an optimal value for the target which accounts for the mis-equalization term:

$$\text{Gradient} = 2 \left( \sum_{m=0}^{t} (e[k-m] - \mu[cond][m]) f[cond][m] \right) (-f[cond][m]).$$

Again, e[k−m] is short for the difference between the reconstructed output and the target error shown in the following equation:

$$e[k-m] = \sum_{j=0}^{z} a_j x[k-j] - \hat{y}[k].$$

Figure 2B:
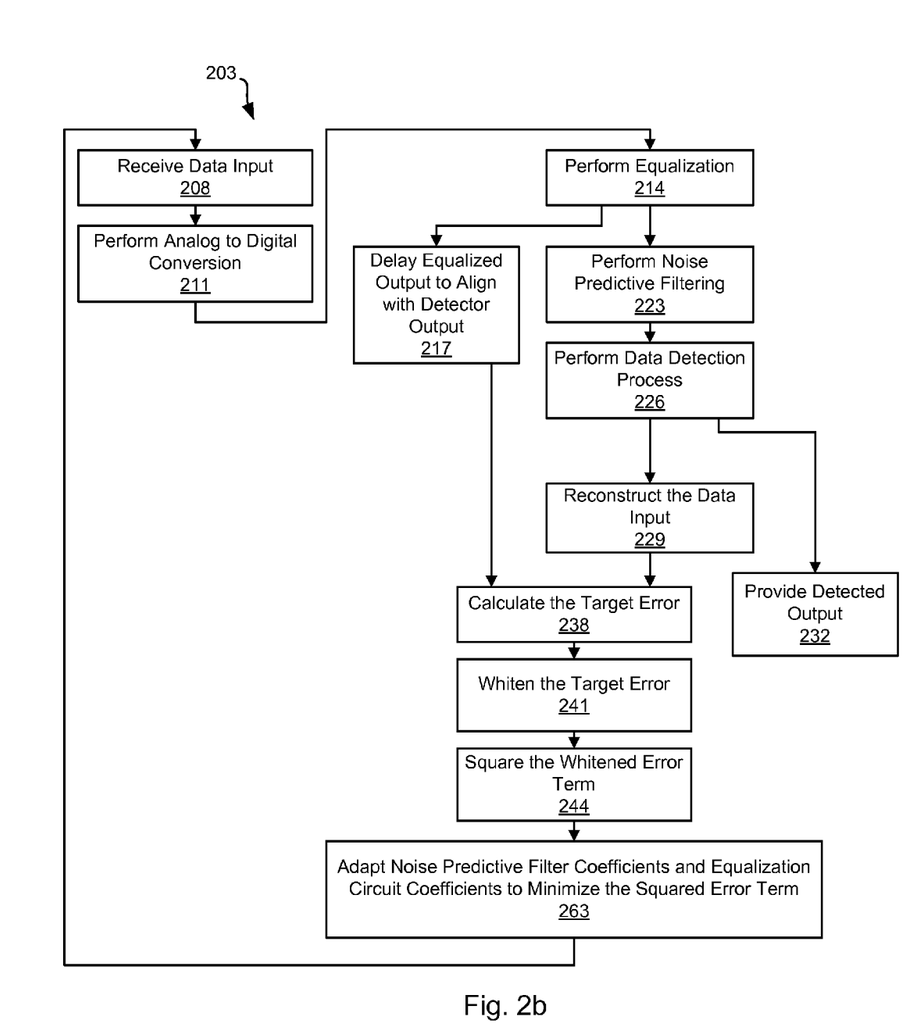
FIG. 2b is a flow diagram showing a process in accordance with some embodiments of the present invention for using the baseline established in the method of FIG. 2a to adaptively adjusting noise processing, equalization and targeting in a data processing circuit.

Turning to FIG. 2b, a flow diagram 203 shows a process in accordance with some embodiments of the present invention for using the baseline established using the process of flow diagram 200 of FIG. 2a to adaptively adjust noise processing, equalization and targeting in a data processing circuit. In particular, prior to operating on actual data inputs, the baseline (i.e., the value established for the target which accounts for the mis-equalization term) is fixed for the specific zone over which it was calculated and stored to a table.

Following flow diagram 203, a known data input is received (block 208). The process of flow diagram 203 is used to process unknown data inputs. Such data inputs are an analog signals representing informational bits at various times or bit locations. The data input may be received from a variety of sources including, but not limited to, a storage medium or a data transfer medium in a communication device. Based upon the disclosure provided herein, one of ordinary skill in the art will recognize a variety of sources for such data inputs.

An analog to digital conversion is applied to the data input to yield a series of digital samples corresponding to respective sample periods (block 211). The resulting digital samples are generally referred to herein as x samples. The analog to digital conversion may be applied using any analog to digital conversion approach known in the art. The resulting series of digital samples are provided to an equalization circuit where they are equalized to an equalization target (block 214). The equalizer circuit is initialized with the equalizer coefficients developed in the process of flow diagram 200. The resulting digital samples are generally referred to herein as y samples, and may be described by the following equation:

y=ax, where a corresponds to the equalization target. The equalization may be done using any equalization process known in the art. For example, in one embodiment of the present invention, the equalization is done using a finite impulse response filter with operation governed by one or more filter taps as is known in the art. The resulting equalized data samples are provided to a noise predictive filter circuit that performs noise predictive filtering to yield a noise whitened output (block 223). The noise predictive filtering may be done using any noise predictive filtering circuit governed based on one or more filter taps as is known in the art.

The noise whitened output is provided to a data detector circuit where a data detection algorithm is applied to the received sample in an effort to recover the originally written data (block 226). This data detection process may be any data detection process known in the art. For example, the data detection process may be a maximum a posteriori data detection process as is known in the art. The resulting detected output is provided as a circuit output (block 232). This detected output may be provided, for example, to a down stream data decoding circuit. Based upon the disclosure provided herein, one of ordinary skill in the art will appreciate a variety of uses for the resulting detected output.

In addition, the resulting detected output is used to reconstruct the data input for comparison purposes (block 229). The resulting reconstructed output is generally referred to herein as ŷ samples. The equalized output (block 214) is delayed in time to align it with the corresponding reconstructed data (block 217). The delayed equalized output and the reconstructed output are combined to calculate a target error (block 238) in accordance with the following equation:

$$\text{Error} = \sum_{j=0}^{z} a_j x[k-j] - \hat{y}[k],$$

where j indicates one of the equalizer coefficients. In one embodiment of the present invention, the equalizer circuit is a ten tap equalizer filter in which case the value of z is nine. Based upon the disclosure provided herein, one of ordinary skill in the art will recognize other equalizer circuits lengths that may be used in accordance with different embodiments of the present invention. Of note, the aforementioned is an ideal equation that may be modified to account for mis-equalization (μ[cond]) that may be considered as part of the target adaptation process discussed below. The modified equation accounting for mis-equalization is as follows:

$$\text{Error} = \sum_{j=0}^{z} a_j x[k-j] - \mu[cond] - \hat{y}[k].$$

The determined error is then noise whitened to yield a whitened error term (block 241) in accordance with the following equation:

Error Term =

$$\sum_{m=0}^{t} \left( \sum_{j=0}^{z} a_j x[k-m-j] - \mu[cond][m] - \hat{y}[k-m] \right) f[cond][m],$$

where m represents each filter tap on a noise predictive filter that performs the f[cond][m] processing. In one particular embodiment of the present invention, the noise predictive filter is a three tap filter length in which case t is equal to two. The error term is then squared (block 244) in accordance with the following equation:

Squared Error=(ErrorTerm)².

The existing noise predictive filter coefficients, equalization coefficients are modified to adaptively minimize the squared error term (block 263). The resulting adapted values are used in processing a newly received data input. The adapted values are calculated using any approach known in the art for optimizing noise predictive coefficients (i.e., f[cond][m]). Using the aforementioned f[cond][m], the following gradient of the squared error (i.e., $$\frac{\partial \eta}{\partial a_n} \Big)$$

is set equal to zero to determine an optimal value for the equalizer coefficients ($a_n$) for each coefficient:

$$\text{Gradient} = 2 \left( \sum_{m=0}^{t} (e[k-m] - \mu[cond][m]) f[cond][m] \right)$$

$$\left( \sum_{m=0}^{t} (x[k-m-n]) f[cond][m] \right),$$

where e[k−m] is short for the difference between the reconstructed output and the target error shown in the following equation:

$$e[k-m] = \sum_{j=0}^{z} a_j x[k-j] - \hat{y}[k].$$

Figure 3:
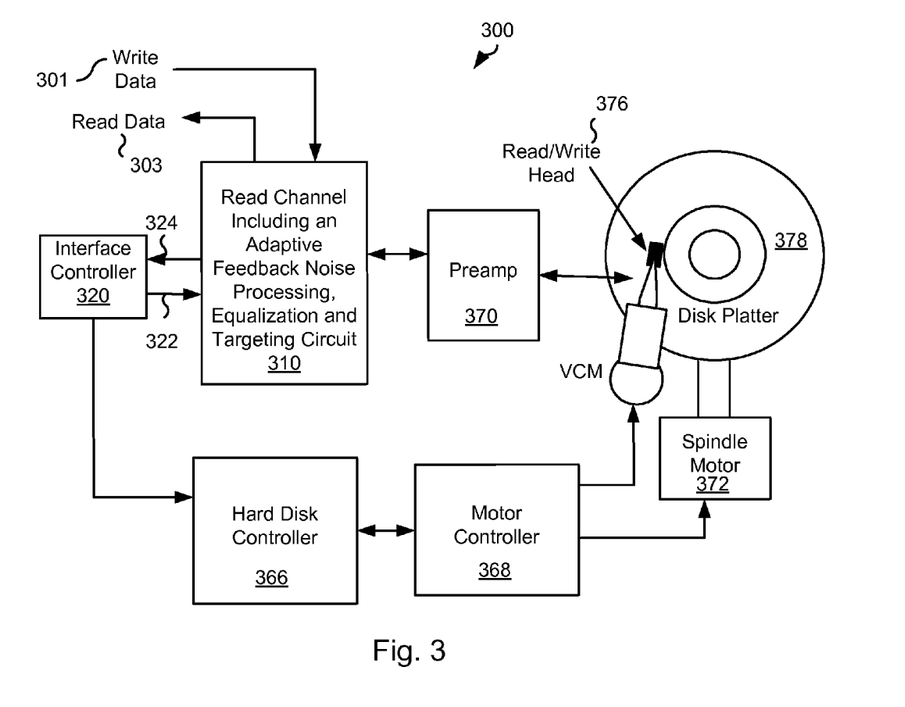
FIG. 3 shows a storage system including an adaptive feedback noise processing, equalization and targeting circuit in accordance with some embodiments of the present invention.

Turning to FIG. 3, a storage system 300 including a read channel circuit 310 with an adaptive feedback noise processing, equalization and targeting circuit is shown in accordance with various embodiments of the present invention. Storage system 300 may be, for example, a hard disk drive. Storage system 300 also includes a preamplifier 370, an interface controller 320, a hard disk controller 366, a motor controller 368, a spindle motor 372, a disk platter 378, and a read/write head 376. Interface controller 320 controls addressing and timing of data to/from disk platter 378. The data on disk platter 378 consists of groups of magnetic signals that may be detected by read/write head assembly 376 when the assembly is properly positioned over disk platter 378. In one embodiment, disk platter 378 includes magnetic signals recorded in accordance with either a longitudinal or a perpendicular recording scheme.

In a typical read operation, read/write head assembly 376 is accurately positioned by motor controller 368 over a desired data track on disk platter 378. Motor controller 368 both positions read/write head assembly 376 in relation to disk platter 378 and drives spindle motor 372 by moving read/write head assembly to the proper data track on disk platter 378 under the direction of hard disk controller 366. Spindle motor 372 spins disk platter 378 at a determined spin rate (RPMs). Once read/write head assembly 378 is positioned adjacent the proper data track, magnetic signals representing data on disk platter 378 are sensed by read/write head assembly 376 as disk platter 378 is rotated by spindle motor 372. The sensed magnetic signals are provided as a continuous, minute analog signal representative of the magnetic data on disk platter 378. This minute analog signal is transferred from read/write head assembly 376 to read channel module 364 via preamplifier 370. Preamplifier 370 is operable to amplify the minute analog signals accessed from disk platter 378. In turn, read channel circuit 310 decodes and digitizes the received analog signal to recreate the information originally written to disk platter 378. This data is provided as read data 303 to a receiving circuit. As part of decoding the received information, read channel circuit 310 performs an adaptive feedback noise processing, equalization and targeting circuit. Such an adaptive circuit may be implemented similar to that described above in relation to FIG. 1, and/or may operate similar to the method discussed above in relation to FIG. 2. A write operation is substantially the opposite of the preceding read operation with write data 301 being provided to read channel circuit 310. This data is then encoded and written to disk platter 378.

It should be noted that storage system 300 may be integrated into a larger storage system such as, for example, a RAID (redundant array of inexpensive disks or redundant array of independent disks) based storage system. It should also be noted that various functions or blocks of storage system 300 may be implemented in either software or firmware, while other functions or blocks are implemented in hardware.

Figure 4:
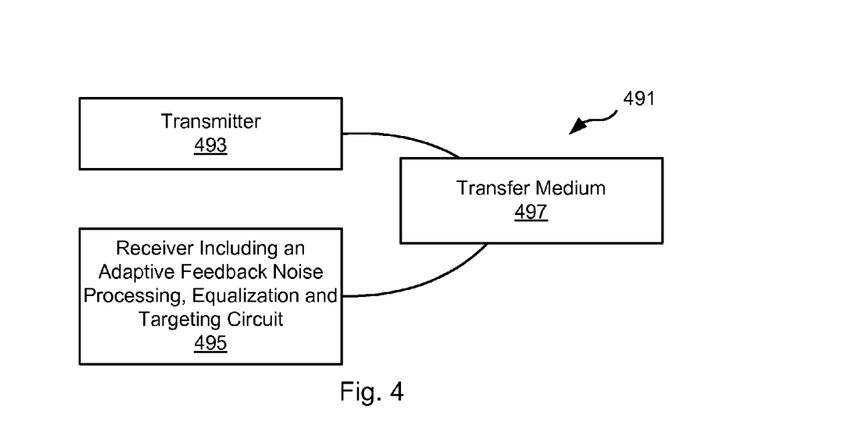
FIG. 4 depicts a communication system including an adaptive feedback noise processing, equalization and targeting circuit in accordance with different embodiments of the present invention.

Turning to FIG. 4, a communication system 400 including a receiver 420 with an adaptive feedback noise processing, equalization and targeting circuit is shown in accordance with different embodiments of the present invention. Communication system 400 includes a transmitter 410 that is operable to transmit encoded information via a transfer medium 430 as is known in the art. The encoded data is received from transfer medium 430 by receiver 420. Receiver 420 incorporates an adaptive feedback noise processing, equalization and targeting circuit. Such an adaptive circuit may be implemented similar to that described above in relation to FIG. 1, and/or may operate similar to the method discussed above in relation to FIG. 2.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for data processing, the method comprising:
   receiving a data input;
   equalizing the data input based on an equalizer coefficient to yield an equalized output;
   performing a data detection on a derivative of the equalized output to yield a detected output;
   reconstructing the detected output based on a target polynomial to yield a reconstructed output;
   aligning the equalized output with the reconstructed output to yield a delayed output;
   calculating a difference between the reconstructed output and the delayed output to yield an error value;
   filtering the error value based at least in part on a filter coefficient to yield a filtered output; and
   using the filtered output to adapt the filter coefficient, the target polynomial, and the equalizer coefficient.

2. The method of claim 1, wherein the data input is received from an analog to digital converter circuit, and wherein the method further comprises:
   receiving an analog input; and
   converting the analog input signal into a digital output, wherein the digital output is the data input.

3. The method of claim 1, wherein the data input is initially a known data input.

4. The method of claim 3, wherein the data input is subsequently an unknown data input, and wherein during processing the unknown data input the target polynomial is fixed to a value adaptively determined during processing the known data input.

5. The method of claim 1, wherein the data input is derived from a storage medium.

6. The method of claim 1, wherein the data input is derived from a transfer medium.

7. The method of claim 1, wherein using the filter output to adapt the target polynomial is done by minimizing a noise whitened and squared version of the error value.

8. The method of claim 7, wherein the noise whitened and squared version of the error value corresponds to the following equation:

$$\left(\sum_{m=0}^{t}\left(\sum_{j=0}^{z} a_j x[k-m-j] - \mu[cond][m] - \hat{y}[k-m]\right) f[cond][m]\right)^2,$$

where $a_j x[k-m-j]$ corresponds to respective bit positions of the equalized output, $a_j x[k-m-j]$ corresponds to respective equalizer coefficients, $\hat{y}[k-m]$ corresponds to respective bit positions of the reconstructed output, $\mu[cond][m]$ corresponds to respective mis-equalization values, and $f[cond][m]$ corresponds to respective filter coefficients.

9. The method of claim 1, wherein using the filter output to adapt the equalizer coefficient is done by minimizing a noise whitened and squared version of the error value.

10. A data processing circuit, the circuit comprising:
    an equalizer circuit operable to receive a data input and to provide an equalized output based at least in part on an equalizer coefficient;
    a noise predictive filter circuit operable to receive the equalized output and to provide a noise whitened output based at least in part on a noise predictive filter coefficient;
    a data detector circuit operable to apply a data detection algorithm to the noise whitened output to yield a detected output;
    a data reconstruction circuit operable to receive the detected output and to provide a reconstructed output corresponding to the equalized output based at least in part on a target polynomial; and an adaptation circuit operable to adaptively calculate the equalizer coefficient, the noise predictive filter coefficient and the target polynomial.

11. The data processing circuit of claim 10, wherein the adaptation circuit includes a summation circuit operable to subtract the reconstructed output from the equalized output to yield an error value.

12. The data processing circuit of claim 11, wherein the adaptation circuit includes:
an equalizer adaptation circuit operable to minimize a noise whitened and squared version of the error value.

13. The data processing circuit of claim 12, wherein the noise whitened and squared version of the error value corresponds to the following equation:

$$\left(\sum_{m=0}^{t}\left(\sum_{j=0}^{z}a_jx[k-m-j]-\mu[cond][m]-\hat{y}[k-m]\right)f[cond][m]\right)^2,$$

where $a_jx[k-m-j]$ corresponds to respective bit positions of the equalized output, $a_jx[k-m-j]$ corresponds to respective equalizer coefficients, $\hat{y}[k-m]$ corresponds to respective bit positions of the reconstructed output, $\mu[cond][m]$ corresponds to respective mis-equalization values, and $f[cond][m]$ corresponds to respective filter coefficients.

14. The data processing circuit of claim 11, wherein the adaptation circuit includes:
a target adaptation circuit operable to minimize a noise whitened and squared version of the error value.

15. The data processing circuit of claim 10, wherein the circuit is implemented as part of an integrated circuit.

16. The data processing circuit of claim 10, wherein the circuit is implemented as part of a device selected from a group consisting of: a storage device and a wireless communication device.

17. The data processing circuit of claim 10, wherein the circuit further comprises:
an analog to digital converter circuit, wherein the data input is an output of the analog to digital converter circuit.

18. A data storage device, the storage device comprising:
a storage medium maintaining a representation of an input data set;
an analog front end circuit operable to sense the representation of the input data set and to provide the input data set as a data input; and
a data processing circuit including:
an equalizer circuit operable to receive a data input and to provide an equalized output based at least in part on an equalizer coefficient;
a noise predictive filter circuit operable to receive the equalized output and to provide a noise whitened output based at least in part on a noise predictive filter coefficient;
a data detector circuit operable to apply a data detection algorithm to the noise whitened output to yield a detected output;
a data reconstruction circuit operable to receive the detected output and to provide a reconstructed output corresponding to the equalized output based at least in part on a target polynomial; and
an adaptation circuit operable to adaptively calculate the equalizer coefficient, the noise predictive filter coefficient and the target polynomial.

19. The storage device of claim 18, wherein the adaptation circuit includes:
an equalizer adaptation circuit operable to minimize a noise whitened and squared version of the error value; and
a target adaptation circuit operable to minimize the noise whitened and squared version of the error value.

20. The storage device of claim 19, wherein the noise whitened and squared version of the error value corresponds to the following equation:

$$\left(\sum_{m=0}^{t}\left(\sum_{j=0}^{z}a_jx[k-m-j]-\mu[cond][m]-\hat{y}[k-m]\right)f[cond][m]\right)^2,$$

where $a_jx[k-m-j]$ corresponds to respective bit positions of the equalized output, $a_jx[k-m-j]$ corresponds to respective equalizer coefficients, $\hat{y}[k-m]$ corresponds to respective bit positions of the reconstructed output, $\mu[cond][m]$ corresponds to respective mis-equalization values, and $f[cond][m]$ corresponds to respective filter coefficients.

* * * * *